US012423262B2

(12) United States Patent
Jaramillo

(10) Patent No.: US 12,423,262 B2
(45) Date of Patent: Sep. 23, 2025

(54) REPEATER GENERATED FORCED RESUME FOR HOSTS WITH AN EUSB REPEATER

(71) Applicant: NXP USA, Inc., Austin, TX (US)

(72) Inventor: Kenneth Jaramillo, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 84 days.

(21) Appl. No.: 18/073,503

(22) Filed: Dec. 1, 2022

(65) Prior Publication Data
US 2024/0184733 A1 Jun. 6, 2024

(51) Int. Cl.
G06F 13/42 (2006.01)
G06F 13/40 (2006.01)
H04B 3/36 (2006.01)

(52) U.S. Cl.
CPC ........... *G06F 13/4282* (2013.01); *H04B 3/36* (2013.01); *G06F 2213/0042* (2013.01)

(58) Field of Classification Search
CPC ......... G06F 13/4282; G06F 2213/0042; H04B 3/36
USPC ......... 710/6, 8, 14, 18, 19, 32, 62, 105, 109
See application file for complete search history.

(56) References Cited

U.S. PATENT DOCUMENTS 8,078,768 B2   12/2011  Manor et al.
10,891,242 B2   1/2021  Wente et al.
2007/0118674 A1  5/2007  Ulenas
2008/0098147 A1*  4/2008  Amano ............... G06F 13/4045
                                          710/300
2014/0006674 A1*  1/2014  Chan .................... G06F 13/4221
                                          710/313
2016/0269126 A1*  9/2016  Maung ................... H04B 10/29
2017/0286360 A1* 10/2017  Srivastava .......... G06F 13/4295
2018/0173666 A1*  6/2018  Srivastava .......... G06F 13/4027
2022/0035433 A1*  2/2022  Franko ................ G06F 11/3062

FOREIGN PATENT DOCUMENTS

WO    2017112065 A1    6/2017

OTHER PUBLICATIONS

Apple, Inc. et al.; "Embedded USB2 (eUSB2) Physical Layer Supplement to the USB Revision 2.0 Specification"; Revision 1.2; 2018; 169 pgs.

* cited by examiner

*Primary Examiner* — Tim T Vo
*Assistant Examiner* — Henry W Yu

(57) ABSTRACT

A detector circuit of an eUSB repeater is coupled to a USB bus to detect a wake signal from a device through the USB bus and to send a forced resume signal to the device in response thereto. Repeater logic of the eUSB repeater repeats the received wake signal to the host. The host has a suspend state and an active state. The detector circuit detects the host resume signal from the host in the active state and stops sending the forced resume signal to the device in response thereto.

19 Claims, 9 Drawing Sheets

REPEATER GENERATED FORCED RESUME FOR HOSTS WITH AN EUSB REPEATER

BACKGROUND

Universal Serial Bus (USB) has been an extreme success as a standard for short-range wired data communication in the electronics industry. USB use is ubiquitous for peripheral devices, accessories, and internal connections and it continues to be the ascendant serial interconnect for electronic devices. USB was originally developed as a universal bus to connect a computer to external peripheral devices and accessories, for example, printers, scanners, keyboards, microphones, and gaming controllers. As the speed of the bus increased and the cost of supporting chips decreased, more types of devices were added. A part of the extreme success is backwards compatibility that allows a keyboard, 25 years old, designed for a 1.5 Mbps interface to be attached to a new 10 Gbps socket connector using the keyboard's original USB Type A-plug connector. The older Low-Speed 1.5 Mbps, Full-Speed 12 Mbps, and High-Speed 480 Mbps modes are still supported in all USB connectors.

USB is also being used as a high-speed data interface within many computers and portable devices. For example, a built-in camera, touch sensor, keypad, microphone, memory, and other devices may all be connected internally using USB. To improve these internal connections, embedded USB 2.0 (eUSB2) allows systems with advanced technology nodes to operate with USB 2.0 in Low Speed mode, Full Speed mode, and High Speed modes similar to USB 2.0 at lower cost. eUSB2 allows data to be carried at less cost on printed circuit board traces, when desired and without the power supply connections of USB.

To allow advanced USB Hosts and Devices to use advanced silicon device geometries, the eUSB2 Specification defines a lower signaling voltage than for external wired links and then defines an eUSB2 repeater as an interface between the two voltages. The repeater converts the lower voltages of eUSB2, used within advanced USB Hosts and Devices, to the higher voltages of USB signaling between devices and vice versa. In addition, during Low-Speed and Full-Speed modes, the repeater also translates the protocol timing between the eUSB2 and USB busses.

SUMMARY

Embodiments of a device and a method are disclosed. In an embodiment, an eUSB repeater with a detector circuit is disclosed. In an embodiment, the device includes a USB transceiver coupled to a device through a USB bus and configured to receive a USB data signal from the device and configured to drive a USB data signal to the device, an eUSB transceiver coupled to a host through an eUSB bus and configured to receive an eUSB data signal from the host and configured to drive an eUSB data signal to the host, wherein the host has a suspend state and an active state, repeater logic coupled to the USB transceiver and the eUSB transceiver configured to receive a wake signal from the device, to repeat the received wake signal to the host, to receive a host resume signal from the host and repeat the host resume signal to the device, the repeater logic further configured to repeat data signals between the device and the host, and a detector circuit coupled to the USB bus configured to detect the wake signal from the device and to send a forced resume signal to the device in response thereto, the detector circuit further configured to detect the host resume signal from the host and to stop sending the forced resume signal to the device in response thereto.

In an embodiment, receiving the wake signal comprises receiving a start of wake from the device as a 1 on both lines of the eUSB transceiver. In an embodiment, the detector circuit is in a low power state upon receiving the wake signal. In an embodiment, the host has a suspend state, wherein the repeater logic sends the received wake signal to the host to wake the host from the suspend state, and wherein the repeater logic receives the host resume signal when the host has exited the suspend state. In an embodiment, the host suspend state is an eUSB L2 suspend state.

In an embodiment, receiving the wake signal comprises receiving a K signal from the device and wherein sending a forced resume signal comprises forcing a K signal on the USB bus during the K signal from the device. In an embodiment, stopping sending the forced resume signal comprises not forcing the K signal on the USB bus. In an embodiment, stopping sending the forced resume signal comprises stopping sending the forced resume signal after receiving a start of resume from the host as a rising edge of a line of the host eUSB bus.

In an embodiment, the detector circuit is further configured to detect an end of wake signal from the device and to continue sending the forced resume signal after detecting the end of wake signal. In an embodiment, the end of wake signal comprises a transition of a line on the USB bus. In an embodiment, the detector circuit is configured to detect an end of resume signal from the host and to repeat the end of resume signal to the device before repeating data signals. In an embodiment, a timer is configured to start after receiving the wake signal from the device, wherein if the timer expires before detecting the host resume signal, then the detector circuit is configured to stop sending the forced resume signal. In an embodiment, the detector circuit is comprised of a state machine.

In an embodiment, a method of sending a forced resume signal is disclosed. In an embodiment, the method involves detecting a wake signal on a USB bus from a device at an eUSB repeater, repeating the wake signal on an eUSB bus to a host coupled to the device through the eUSB repeater, sending a forced resume signal from the eUSB repeater to the device in response to detecting the wake signal, detecting a host resume signal from the host on the eUSB bus sent by the host in response to repeating the wake signal, stopping sending the forced resume signal to the device; and repeating the host resume signal to the device on the USB bus.

In an embodiment, the method involves repeating data signals between the device and the host on the USB bus after repeating the host resume signal. In an embodiment, detecting the wake signal comprises receiving a start of wake from the device as a 1 on both lines of the USB bus. In an embodiment, detecting the wake signal comprises receiving a signal from the device on the USB bus and wherein sending a forced resume signal comprises forcing a K signal on the USB bus during the K signal from the device. In an embodiment, stopping sending the forced resume signal comprises not forcing the K signal on the USB bus.

In an embodiment, the detector circuit is in a low power state upon detecting the wake signal. In an embodiment, the host has a suspend state, wherein repeating the wake signal causes the host to wake from the suspend state, and wherein detecting the host resume signal is after the host exits the suspend state. In an embodiment, the host suspend state is an eUSB L2 suspend state.

In an embodiment, a state machine of an eUSB repeater is disclosed. In an embodiment the state machine involves a host suspend state in which a host coupled to the state machine is in a low power state and the repeater is able to receive signals on a USB bus from a device, a host waking state in which the host is waking from the suspend state in response to a wake signal from the device and in which the repeater is forcing a wake state on the USB bus, a pass host resume state in which the host is active from the suspend state and has sent a wake signal to the repeater, in which the repeater is not forcing the wake state, in which the repeater is in a transparent state repeating signals from the host to the device, and a host active state in which the host is active and in which the repeater is in a transparent state repeating signals between the host and the device.

DETAILED DESCRIPTION

Figure 1:
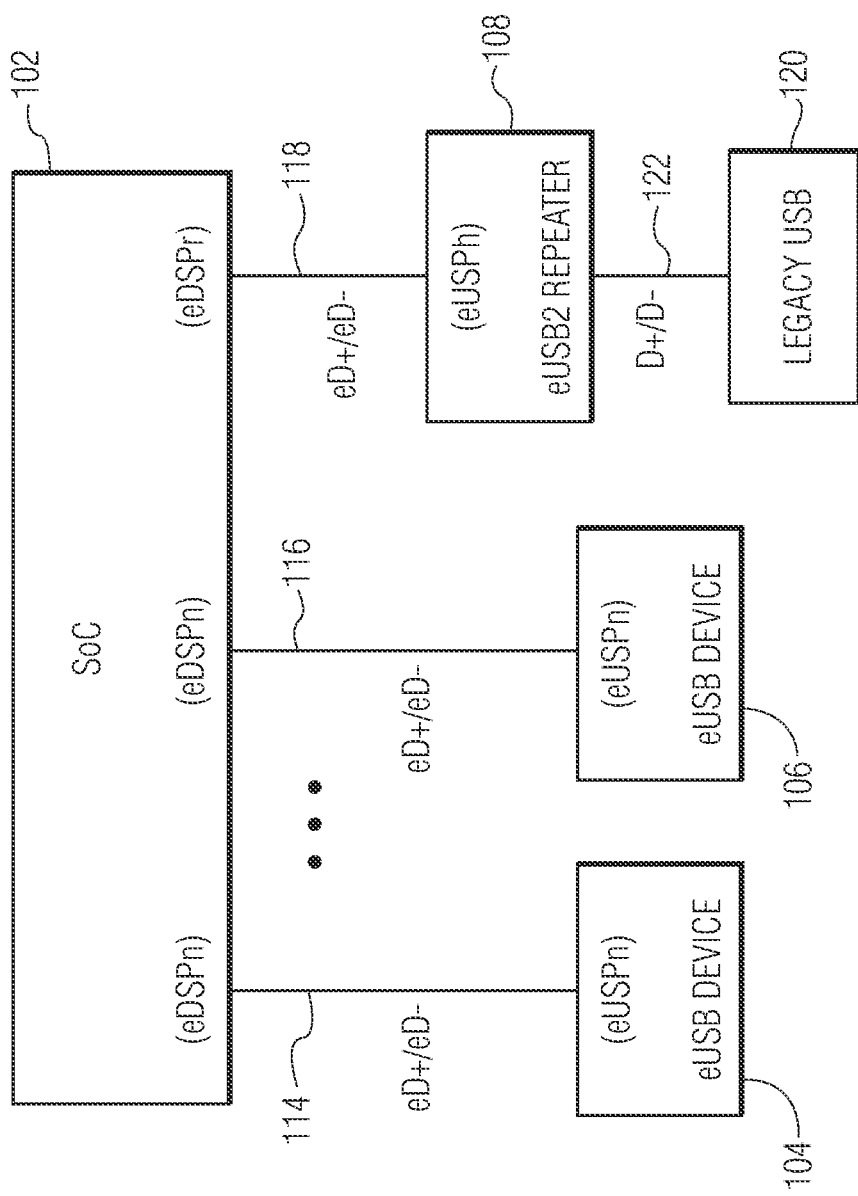
FIG. 1 is a block diagram of a system on a chip (SoC) that is coupled to multiple peripheral devices using eUSB.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

As described herein, a host side eUSB repeater detects the start of the device wake on a USB bus. The eUSB repeater then forces a resume, a forced resume, that appears to the device to be a host resume onto the USB bus and passes the wake to the host. When the host generates its host resume eventually, then the eUSB repeater passes this host resume down to the USB bus and lets the process complete normally in which the host exits from being suspended and in a low power state to being in an active state. Stated another way, a USB device sends a resume or wake signal to a host to signal the host to wake from a low power state, e.g., a suspend state. In eUSB, the USB wake signal is received by an eUSB repeater that repeats the wake signal as an eUSB signal to the host. When the host does not wake quickly enough, the eUSB repeater may also generate a response to the USB device until the host has resumed from the low power state. By allowing for deeper sleep, suspend, or standby states with longer wake times, the host uses less power when it is inactive. USB ports are often not all used and those that are connected to a device or host are often inactive. Accordingly, there are a variety of lower power states allowed for USB interfaces. On the other hand, unused ports must be able to detect and identify a new connection. Connected but inactive ports must be able to resume data communication quickly.

The USB 2.0 Specification defines an allowed exit time duration for USB 2.0 Hosts from their suspend state. A USB 2.0 device issues a short wake pulse of 1 ms in order to wake the USB 2.0 host so that normal operation can continue. The maximum allowed device wake pulse duration is defined as 15 ms. As the use of USB expands beyond simple hosts and as eUSB allows USB to connect directly to complex semiconductor devices, deeper suspend states allow for greater power savings. These electronic devices, including smart phones, tablets, smart watches, etc., are more complex than a USB host that easily wakes within a 1-15 ms time pulse. The additional complexity and the deeper suspend states allow for more of the device to be shut down providing for more power savings. At the same time, exiting the suspend state in response to a wake signal may take much more time.

For portable, mobile, and other battery-powered devices, saving power means longer battery life and a more enjoyable experience for the user. External USB ports are not connected most of the time. Desktop and fixed device power use is also important. A user only plugs a phone into a charger or other peripheral device for a small percentage of the time. Reduced power consumption for unused USB ports and for connected USB ports may significantly improve battery life. The USB standards define various low power states for low or no activity. USB 2.0 defines L1 and L2 suspend states. USB 3.0 defines U1, U2, and U3 states. By implementing these low power states, the protocol allows USB related devices, e.g., hosts, devices, hubs, repeaters, etc., to save significant power.

Semiconductor devices are typically configured to disable as much as possible during these low power states while still allowing quick enough wake up from the low power states. The lower the power used, the longer it takes for the device to wake. For USB, there are basic USB related activities that must be supported even in these low power states. For example, eUSB Control Messages may be issued while an eUSB Repeater is in its suspend state. An eUSB Host may issue a Start of Resume in order to wake the system while the host side eUSB Repeater is in its suspend state. An eUSB Device may issue a Start of Wake in order to wake the host while the device side eUSB Repeater is in its suspend state.

The eUSB2 Specification describes a supplement to USB 2.0 for low voltage, embedded use that operates in all three speed modes of USB 2.0: USB 1.0 Low Speed (LS); USB 1.1 Full Speed (FS); and USB 2.0 High Speed (HS). Low Speed and Full Speed use single-ended signaling in eUSB2, while High Speed (sometimes called Hi-Speed) uses differential signaling in eUSB2. The eUSB2 Specification refers to repeater mode as eUSB2 to USB2 or as USB2 to eUSB2 regardless of the speed mode. In the present description "eUSB" will be used to refer to any modes of eUSB2 or any other suitable single-ended signaling system and "USB" will be used to refer to any modes of USB 2.0 or any other suitable modes of differential signaling. While the present description is presented in the context of Universal Serial Bus structures and methods, the structure and methods herein may be applied to translations between other single-ended and differential signaling systems. While the present description is presented in the context of Low Speed and High Speed mode, the present description may be applied to other modes and to successors of these modes, notwithstanding changes to the naming conventions that are used. It should be noted that USB has been implemented without consistently enforced naming conventions and that even these inconsistent naming conventions may be changed retroactively. Thus, it may happen that "USB 2.0" may soon be referred to primarily as "USB2."

FIG. 1 is a block diagram of a system on a chip (SoC) 102 that is coupled to multiple peripheral devices using eUSB. The SoC 102 is coupled to a first eUSB device 104 through an eUSB connection 114, which may be a single-ended connection in at least some modes. The SoC has a downstream eUSB2 port in native mode (eDSPn). The device has an upstream eUSB2 port in native mode (eUSPn). The connection 114 between these ports has lines with an eUSB2 data+ pin (eD+) and an eUSB2 data− pin (eD−). The eUSB connection 114 may be through printed circuit board (PCB) traces, wire lines, or any other suitable internal or embedded connection. An nth eUSB device 106 is coupled through an nth eUSB connection 116.

The SoC 102 is also coupled to one or more legacy USB devices 120. The SOC has a downstream eUSB2 port facing host repeater (eDSPr). That is connected through an eUSB connection 118 to an upstream eUSB2 port of the host repeater (eUSPh) at an eUSB2 repeater 108. The eUSB2 repeater 108 connects through a USB2 connection 122 to one or more legacy USB devices 120.

As shown, the SOC 102 operates in two modes of operation: native mode and repeater mode. The native mode refers to a host port, eDSPn) of the SoC 102 communicating directly to native eUSB devices 104, 106 through a device port, eUSPn, both implementing an eUSB PHY and communicating based on eUSB signaling, for example eUSB2 signaling. Native mode eUSB is particularly suitable for inter-chip interconnect.

Repeater mode refers to an eUSB port, eDSPr, of the SoC 102 communicating with a USB port of a USB device 120 through a repeater 108 that translates between eUSB signaling and USB signaling, for example eUSB2 and USB 1.0, USB 1.1 or USB 2.0 signaling.

Figure 2:
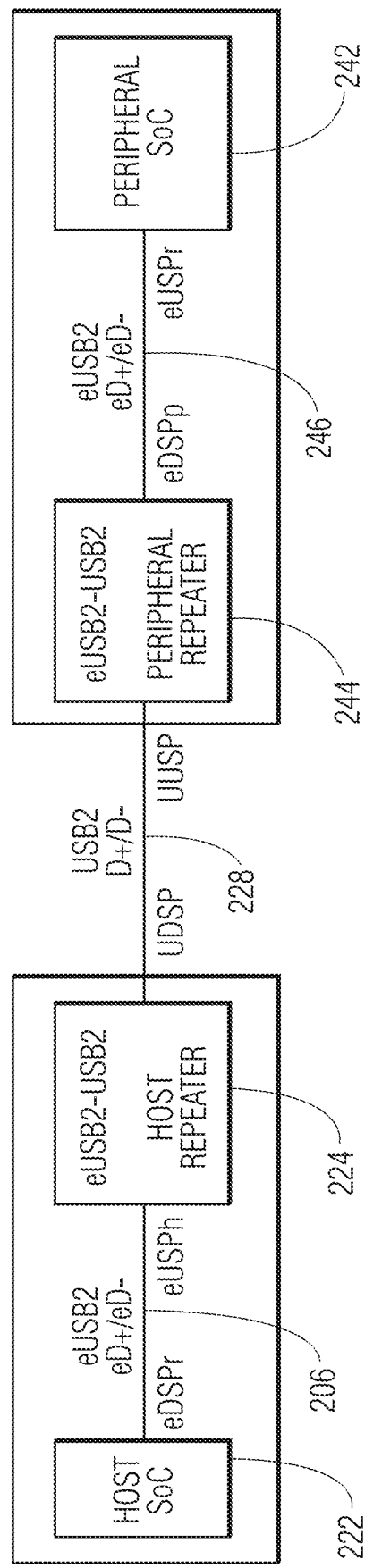
FIG. 2 is a block diagram of a host SoC coupled to a peripheral SoC connected through a USB line, for example a cable or PCB traces.

FIG. 2 is a block diagram of a host SoC 222 coupled to a peripheral SoC 242 connected through a USB line 228, for example a cable or PCB traces. In this example, the host SoC 222 is coupled through an eUSB link 206 with eD+/eD− lines to a host repeater 224. The peripheral SoC 242 is coupled through an eUSB link 246 with eD+/eD− lines to a peripheral repeater 244. The host repeater 224 and the peripheral repeater 244 are connected together using the USB line 228 with D+/D− lines. The host repeater 224 and the peripheral repeater 244 communicate with each other in a repeater mode, indicated as eUSB-USB. This configuration may be suitable for when two eUSB devices are connected through a USB line 228, for example a cable and USB connectors or ports at both sides of the device ports. The host SoC 222 and the peripheral SoC 242 are able to communicate using the lower voltage eUSB signaling that is more suitable for the physical construction of ICs while being connected using the more robust, higher voltage, USB differential signaling through the USB line 228. The host SoC and peripheral SoC may also be coupled to other devices (not shown) in native mode and in repeater mode.

Figure 3:
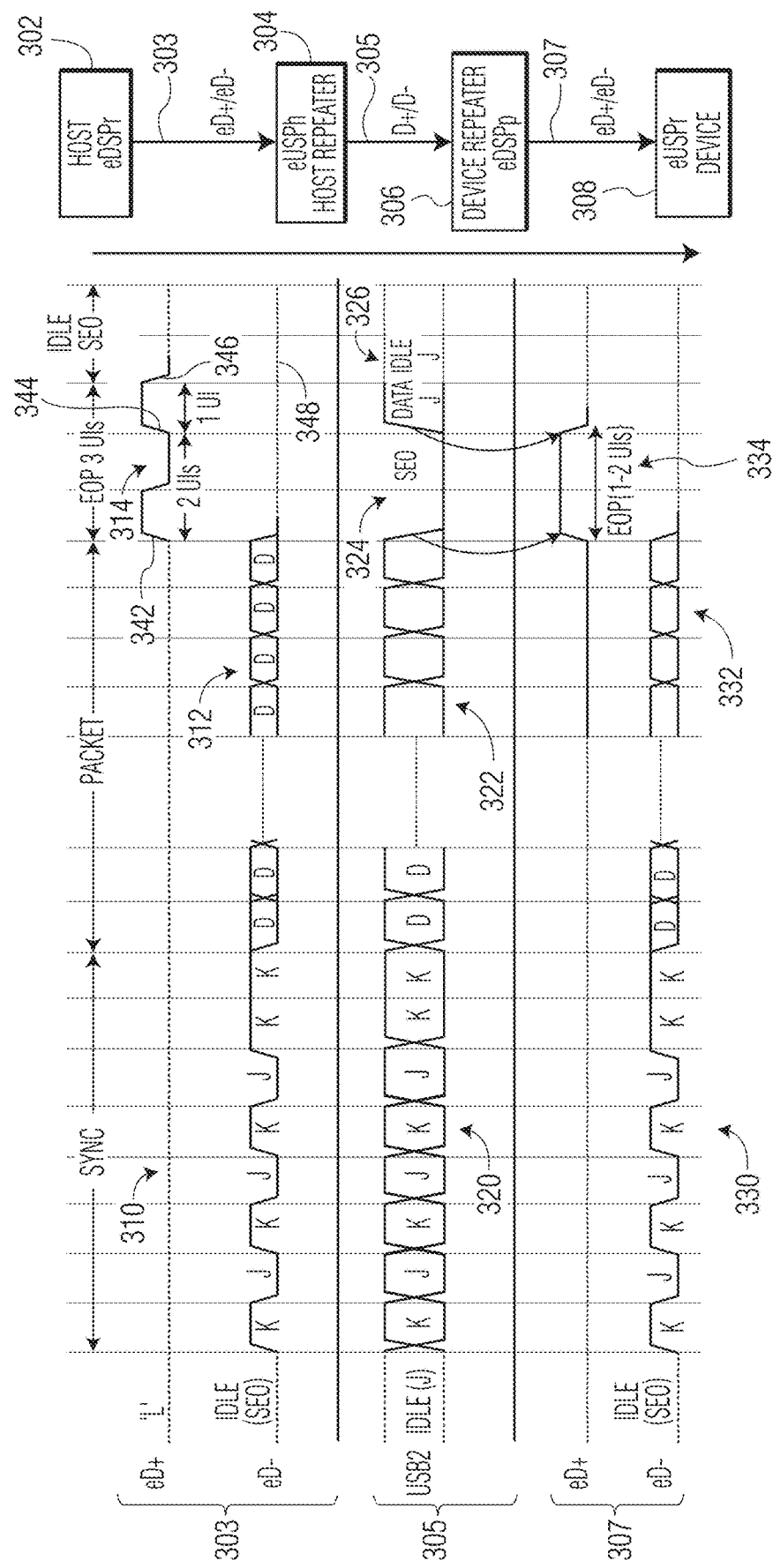
FIG. 3 is a signal timing diagram of a Full Speed packet being sent from an eUSB Host to an eUSB Device through a Host eUSB repeater and a Device eUSB repeater.

FIG. 3 is a signal timing diagram of a Full Speed packet being sent from an eUSB Host 302 to an eUSB Device 308 through a Host eUSB repeater 304 and a Device eUSB repeater 306. Full Speed mode, originally introduced with USB 1.1. is supported as a legacy mode in USB 2.0 and with a few changes from USB 1.1 in eUSB2. The top portion of the signal timing diagram shows the Host side eUSB bus 303, between the Host side eUSB Host 302 and the Host eUSB repeater 304. The middle portion of the signal timing diagram shows the USB bus 305 between the Host eUSB repeater 304 and the Device eUSB repeater 306. The bottom portion of the signal timing diagram shows the Device side eUSB bus 307 between the Device eUSB repeater 306 and the eUSB Device 308.

The Host 302 initiates a Full Speed packet on its eUSB bus 303. The packet from the Host 302 is shown on the top portion Host side eUSB bus 303 of the timing signal diagram. The majority of the packet is sent on the eUSB bus eD− signal. The packet starts with the typical USB packet SYNC pattern 310, KJKJKJKK, and then is followed by the normal packet data 312. The packet ends with an End of Packet (EOP) pattern 314, toggling on the eUSB bus eD+ signal.

The middle portion of the timing signal diagram of FIG. 3 shows how the Full Speed packet from the Host 302 gets translated by the Host eUSB Repeater 304 and generated onto the USB bus 305. The Host eUSB repeater 304 first translates the eUSB signaling on eD− to differential signaling on USB. This happens to translate the SYNC pattern 320 and to translate the packet data 322. When the EOP pattern 314 occurs on the host side eUSB eD+ signal, the eUSB Repeater converts that to a USB formatted EOP for the USB bus. The first rising edge on eD+ 342 causes the eUSB repeater to drive an SE0 324 signal (Single-Ended Zero) on the USB lines in which the signal on both lines of the USB bus 305 are low. The second rising edge on eD+ 344 causes the eUSB Repeater to drive the USB bus 305 to a USB data J state 326. The last falling edge on eD+ 346 then causes the eUSB Repeater to tristate the USB bus and let the USB pullup and pulldown resistors hold the bus in an Idle J state. The SE0 condition provides a time gap between data packets.

For a digital data line with two voltage states, high and low, a tristate is a third state for which the line is set to a high impedance (high Z) with no particular applied voltage. As a result, any other device connected to the line is able to control the state of the line.

The Device eUSB repeater 306 translates the signals on the USB bus 305 into Device side eUSB bus 307 single-ended signaling as shown on the bottom section of the timing signal diagram. The SYNC pattern 320 on USB bus 305 causes the Device eUSB repeater 306 to drive the device side eUSB eD− line with the SYNC pattern 330. The packet data 322 on the USB bus 305 is translated as a data pattern 332 on the eUSB eD− line. The EOP on the USB bus 305 which is an SE0 324 followed by data J and idle J causes the Device eUSB repeater 306 to drive the eUSB eD+ line high to generate an EOP signal 334 during the USB bus SE0 324 condition and then low afterwards.

USB Full Speed packets are also sent from the eUSB Device 308 to the Host 302 through the Device eUSB repeater 306 and the Host eUSB repeater 304. The packet and EOP signals from the eUSB Device 308 are the same as those from the Host 302 and translated through the repeaters in the same way but in the opposite direction. These signals are defined in the eUSB2 Specification and there is a reciprocity that applies to signals so that they are the same regardless of direction.

While FIG. 3 shows USB Full Speed mode packets in eUSB, USB Low Speed mode and USB High Speed mode are also supported and may be used for packets from the Host to the Device and vice versa. In Low Speed mode the eUSB signals are swapped from how they are sent during Full Speed mode. Instead of using eD− on the eUSB line, it is eD+ which carries the SYNC signal and the packet data. Instead of eD+, it is eD− which carries the packet's EOP signals. Otherwise, the repeaters perform the same functions. The differential signals of the USB signal are the same except with reversed polarity. For example, a Full Speed J is transmitted as D+ being high while D− is low. A Low Speed J is transmitted as D− being high while D− is low. In repeater mode, also referred to as transparent mode, the repeaters facilitate the passing of packets from each bus to the other bus, converting the eUSB signals to USB signals and vice versa as shown in FIG. 3. At an eUSB Repeater, if eD+ rises before eD−, then this indicates the start of a Low Speed mode packet. If eD− rises before eD+, then this indicates the start of a Full Speed mode packet.

On the USB bus 305, there is a string of transitions during the SYNC pattern 320 and the packet data 322. At any of the data bit transitions on the USB bus 305 from J to K or K to J, there may be a period of time during which both lines are low before finally transitioning to the next bit state. This low state is referred to as SE0 (Single-Ended Zero). Instead of a clean J to K transition, the USB bus 305 may, for example, transition from J to SE0 and then from SE0 to K. This SE0 period is supposed to be less than 14 ns for USB Full Speed mode timing and less than 210 ns for USB Low Speed mode timing. An eUSB Repeater 304, 306 translating the packet from USB to eUSB filters out the temporary SE0 conditions.

In operation, for incoming eUSB packets, the repeater will look for the start of a packet as the presence of the first SYNC bit of the SYNC pattern and enable the other side of the eUSB repeater, the USB2 full speed driver, to pass the incoming packet from eUSB to USB2. The drivers will then pass the SYNC bits and packet data carried on the eUSB data line (eD− for full speed mode and eD+ for low speed mode) to the USB2 bus. Once the end of the packet arrives on the eUSB control line (eD+ for full speed mode and eD− for low speed mode), then the repeater will use the first portion of the EOP (high going pulse on eUSB control line followed by low period) to drive an SE0 condition on the USB2 bus. The repeater then uses the end of the EOP (second high going pulse on eUSB control line) to drive the USB2 bus to a data J condition before releasing the bus.

In the reverse direction from USB2 to eUSB. The repeater uses the same strategy to pass packets from USB2 to eUSB converting from differential signaling to single ended signaling. First the USB2 SYNC bit is detected at the start of the incoming USB2 packet then the eUSB data line is enabled to convert the differential SYNC bits and packet data bits from USB2 to single ended signaling on the eUSB data line. When the SE0 of the EOP is received on the USB2 bus, the eUSB control line can be driven high. Lastly when the EOP ends on the USB2 side, the eUSB lines may be released.

Figure 4:
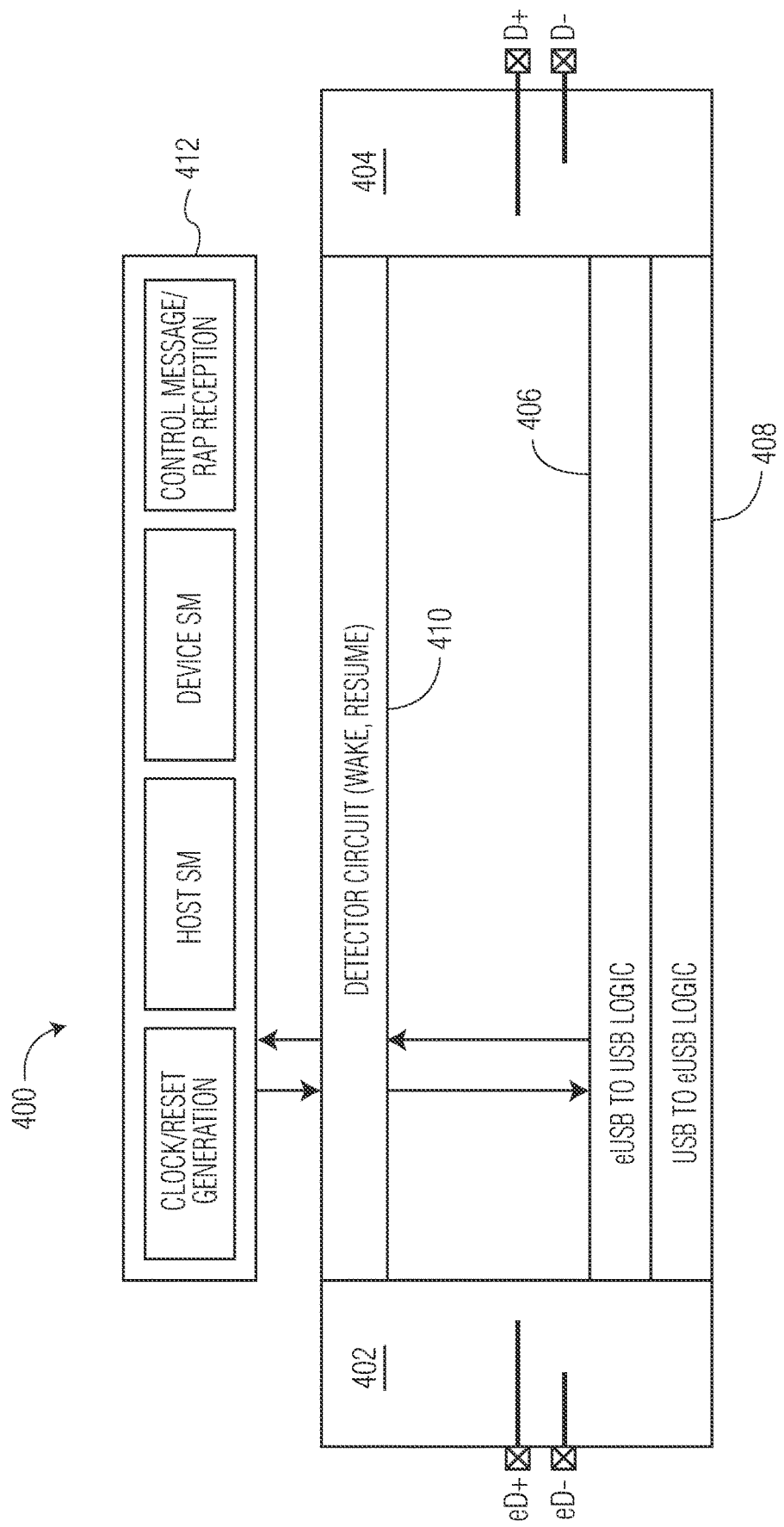
FIG. 4 is a block diagram of a repeater, for example any single-ended to differential repeater or any eUSB repeater with a detector circuit

FIG. 4 is a block diagram of a repeater 400, for example any single-ended to differential repeater or any eUSB repeater with a detector circuit. For a host repeater, the repeater 400 has a eUSB transceiver 402 coupled to the host through eUSB and is configured to receive an eUSB data signal from the host and to drive an eUSB data signal to the host. The eUSB transceiver 402 has a dp eUSB receiver output driver to generate a received dp signal and a dm eUSB receiver output driver to generate a received dm signal. For a device, the repeater is coupled to the device through the eUSB. The device repeater is configured to receive an eUSB data signal from the device and is configured to drive an eUSB data signal to the device. In repeater mode, the receive signals are provided to an eUSB to USB Repeating Mode Logic 406 which provides, in response, transmit signals to a USB transceiver 404. The transmit signals carry the data, EOP and SE0 information as described above. These are coupled to a transmitter output driver of the USB transceiver 404. The transmitter output driver generates USB signals for the USB bus as described above.

The USB transceiver 404 also has a dp eUSB receiver output driver to generate a received dp signal and a dm eUSB receiver output driver to generate a received dm signal. Both of these signals are provided to a USB to eUSB Repeating Mode Logic 408 which provides, in response, transmit signals to the eUSB transceiver 402. The transmit signals are data and enable signals for eUSB transmitter output drivers. For a host repeater, the USB transceiver is coupled to a device through the USB. The host repeater is configured to receive a USB data signal from the device and to drive a USB data signal to the device. For a device repeater, the USB transceiver is coupled to a host through the USB. The device repeater is configured to receive a USB data signal from the host and to drive a USB data signal to the host.

The repeater 400 connects the eUSB transceiver to the USB transceiver with repeater logic. In transparent mode, the repeater logic repeats data signal and control signals from one bus to the other. The repeater logic includes the eUSB to USB Repeating Mode Logic 406 and the USB to eUSB Repeating Mode Logic 408. Both parts of the repeater logic are also coupled to high-level logic 412. The high-level logic 412 may include logic to handle non-repeating mode operations such as clock/reset generation, Host state machine (SM), Device SM, control message handling and register access protocol (RAP) reception. The control functions may include circuit startup, connection, suspend, resume, wake, bus reset, port reset detection, etc.

The signals at the eUSB transceiver 402 and at the USB transceiver 404 are monitored by a detector circuit 410. The detector circuit 410 is coupled to the other components, e.g., the eUSB to USB Repeating Mode Logic 406, the USB to eUSB Repeating Mode Logic 408, and the high-level logic 412, to become active when other components are in standby, suspend, or other low power states. The detector circuit 410 is coupled to the eUSB transceiver 402 and the USB transceiver 404 to receive signaling on each bus and then to wake or resume the respective component in response. Alternatively, the host and device are in their suspend state and all of the repeater is in its active state when the device wake occurs. The operation of the repeater is otherwise the same.

The eUSB2 Specification specifies a few activities that may occur while a repeater is in one of the low power states, e.g., L1 or L2 suspend. A repeater may receive an eUSB Control Message during this time. This could be used to change the power level between an eUSB L2 state, the lowest power level with the slowest exit time, and an eUSB L1 state, a higher power level with a faster exit time. This could be used to request that the host side eUSB repeater issue a USB Bus Reset, etc. A host side eUSB repeater may receive a Start of Resume from an eUSB Host to cause the repeater to send resume signaling down to the USB device. A device side eUSB repeater may receive a Start of Wake from an eUSB Device to cause the repeater to send the wake up to the USB Host. Other control messages may be added or used to suit particular implementations.

Figure 5:
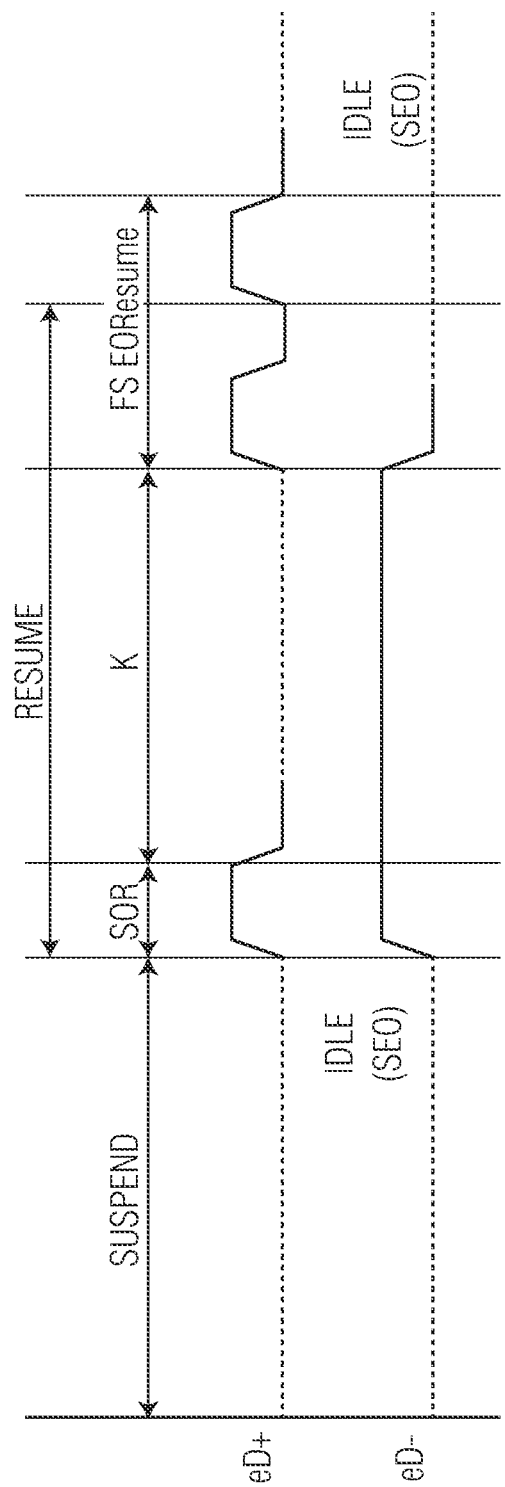
FIG. 5 is a timing diagram of a Start of Resume (SOR) signal as defined in the eUSB2 Specification in Full Speed (FS) Mode.

FIG. 5 is a timing diagram of a Start of Resume (SOR) signal as defined in the eUSB2 Specification in Full Speed (FS) Mode. Initially, the eUSB bus is in an SE0 condition with both lines held low. This may be done with pull-down resistors or in another way. The USB FS mode SOR starts with both eUSB lines being driven high as (single-ended 1) SE1 followed by eD+ going low and eD− staying high. This period is called a USB K and has a duration of several milliseconds. When the host wishes to end the resume, it does so by driving eD− low and pulses eD+ high two times. The lines then return to an SE0 idle state.

The USB Low Speed (LS) mode SOR followed by resume is the same as that for FS mode except that the role of eD+ and eD− are reversed. eD+ stays high and eD− goes low after the initial SE1.

Figure 6:
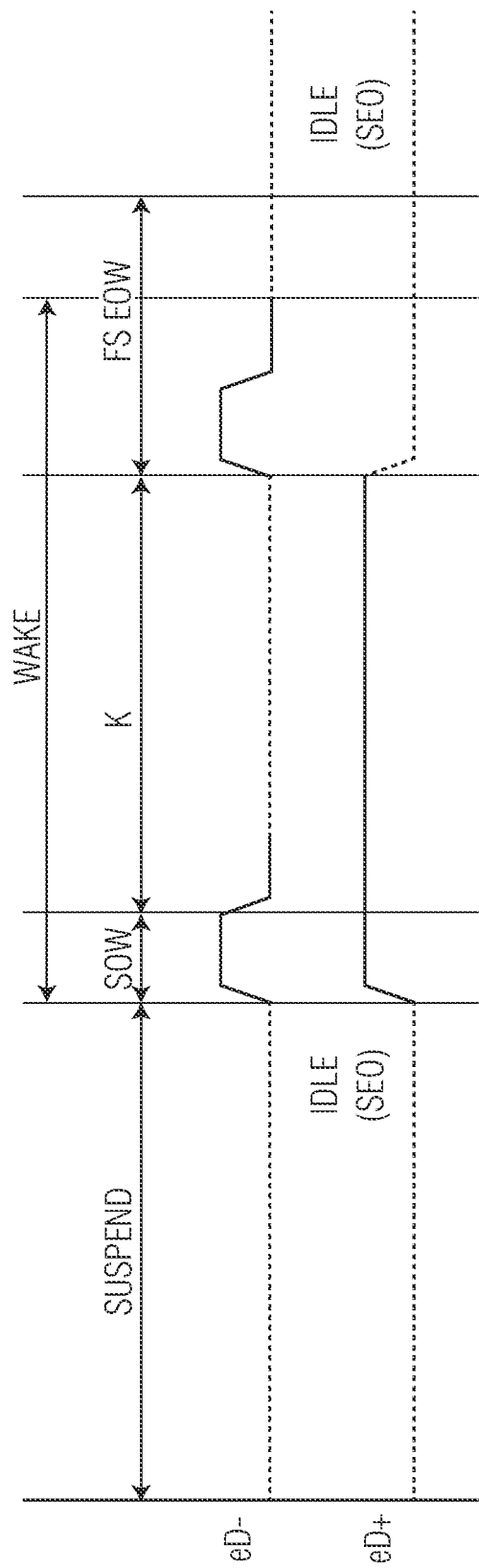
FIG. 6 is a timing diagram of a Start of Wake (SOW) signal as defined in the eUSB2 Specification in Full Speed Mode.

FIG. 6 is a timing diagram of a Start of Wake (SOW) signal as defined in the eUSB2 Specification in Full Speed Mode. Initially, during the suspend period of the timing diagram, the eUSB bus is in an SE0 condition with both lines eD− and eD+ held low. This corresponds to the host being in a suspend state as indicated in the upper timeline. The two lines of the eUSB bus maybe held low done with pull-down resistors or in another way. The USB FS mode SOW starts with both eUSB lines being driven high (SE1) as shown as SOW in the upper timeline. This is followed by eD+ going low and eD− staying high. This period is called a USB K and lasts from 1-15 milliseconds if the device is in a standards-compliant L2 Suspend State. The device ends the wake signal by sending an end of wake signal (EOW) by driving eD− low and pulses eD+ high. This is indicated as FS EOW (End of Wake) in the upper timeline. The two lines of the eUSB bus then return to an SE0 idle state.

The USB Low Speed (LS) Mode SOW followed by wake is the same as that for FS mode except that the role of the eUSB lines eD+/eD− are reversed.

As shown, the SOR and the SOW have the same signals. The difference is that the SOR is monitored for by the host side eUSB repeaters while the SOW is monitored by the device side eUSB repeaters. Accordingly, they can both be handled using the same circuitry. While the present description refers to an SOR and SOR section, the same description applies also to SOW.

Figure 7:
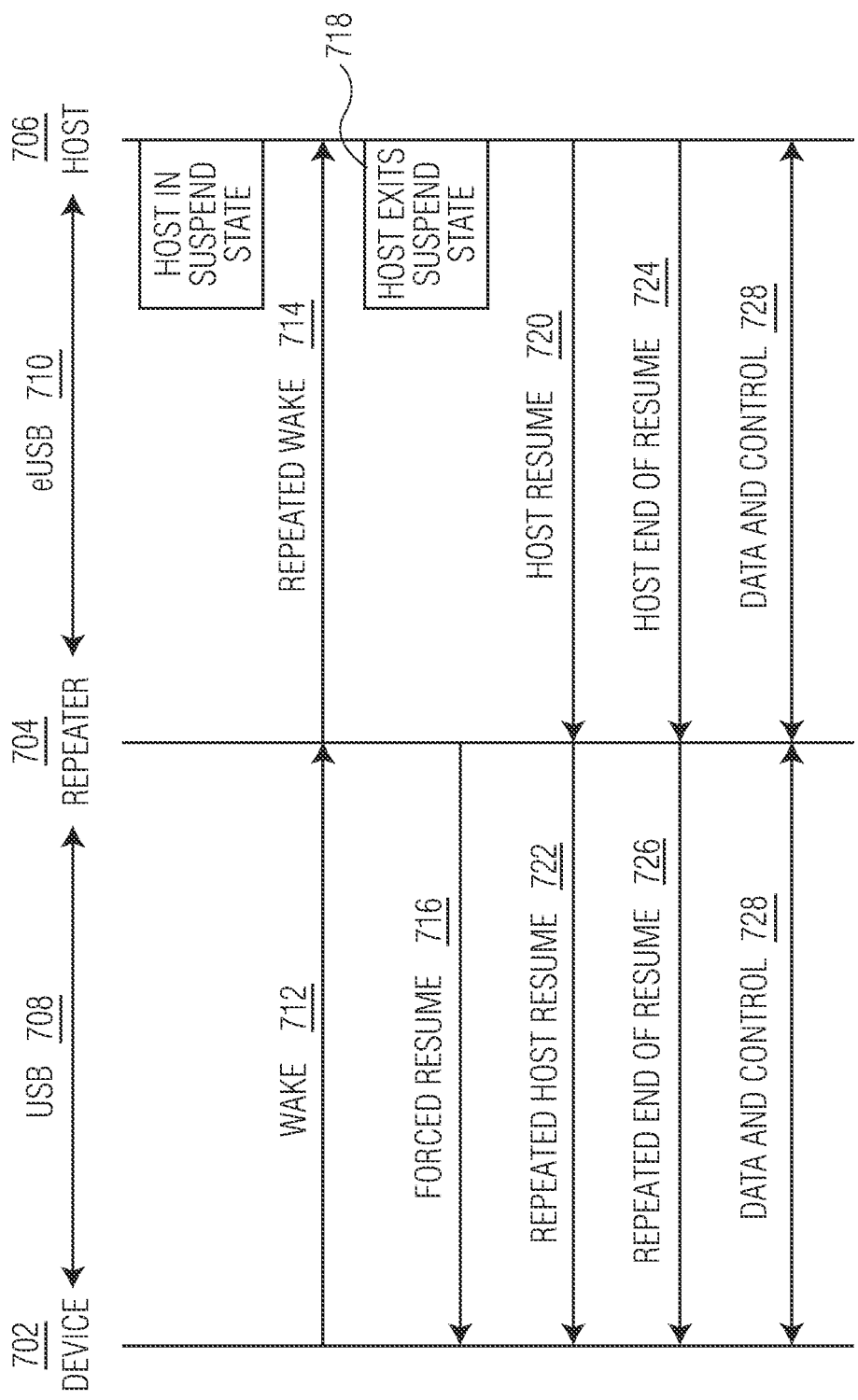
FIG. 7 is a signaling diagram of a simplified resume process using a detector circuit to respond to a device host.

FIG. 7 is a signaling diagram of a simplified resume process using the detector circuit 410 to respond to a device host. The signaling diagram indicates the sources of the signals but not the duration of the signals. Time is from top to bottom in that the first signal is at the top. The signals are between a device 702 coupled through a USB bus 708 with or without an eUSB device repeater to a host eUSB repeater 704. The host eUSB repeater is coupled through an eUSB bus 710 to a host 706. When the device 702 is active and ready to communicate with the host 706, the device 702 sends a wake signal 712. The device sends the wake signal by driving a K signal on the USB bus. This may occur when the device 702 is coupled to a host hub or port and has been inactive, e.g., in a suspend state. The host eUSB repeater 704 receives the wake signal 712 from the device 702 through the USB bus 708 and repeats the wake signal as a repeated wake signal 714 to the host 706 through the eUSB bus 710.

The host 706 receives the repeated wake signal 714. If the host 706 is in an active state or in some low-power states, e.g., an L1 Suspend State, then it will respond quickly with a host resume signal. In the example of FIG. 7, the host 706 is in a lower power state from which it cannot quickly resume. The L2 Suspend State is an example of such a state. In response to the repeated wake signal 714, the host 706 initiates a process 718 to exit the suspend state. During this process 718, the host 706 does not send any signal to the device through the host eUSB repeater 704.

During the process 718 of the host exiting the suspend state, before the host 706 has resumed and become active, the host eUSB repeater 704 sends a forced resume signal 716 that the host eUSB repeater 704 generates back to the device 702 through the USB bus 708. The host repeater sends the forced resume signal by forcing a K signal on the USB bus during the K signal from the device. The device will respond to the forced resume signal 716 as if it were a host resume signal received directly from the host 706. After the host 706 has resumed and become active, the host 706 sends a host resume 720 to the host eUSB repeater 704 through the eUSB bus. The host eUSB repeater 704 ends its own forced resume signal 716 by not forcing the K signal on the USB bus and sends a repeated version of the host resume 722 to the device 702 through the USB bus 708. The repeater's forced resume signal 716 informs the device 702 that the host is available but provides some additional time for the host to resume. When the host is fully active then it sends an end of resume (EOR) signal 724 to the repeater which the repeater then sends to the device on the USB bus as a repeated EOR signal 726. The form of the repeated EOR signal may be adapted to suit different implementations. In one example, the EOR signal 726 is sent to the device as an SE0 signal with both lines low. The forced resume signal allows the host to be in a deeper suspend state that takes longer to resume from.

After the host 706 sends the EOR signal 724, data and control traffic 728 is communicated between the device 702 and the host 706 through the host eUSB repeater 704.

Figure 8:
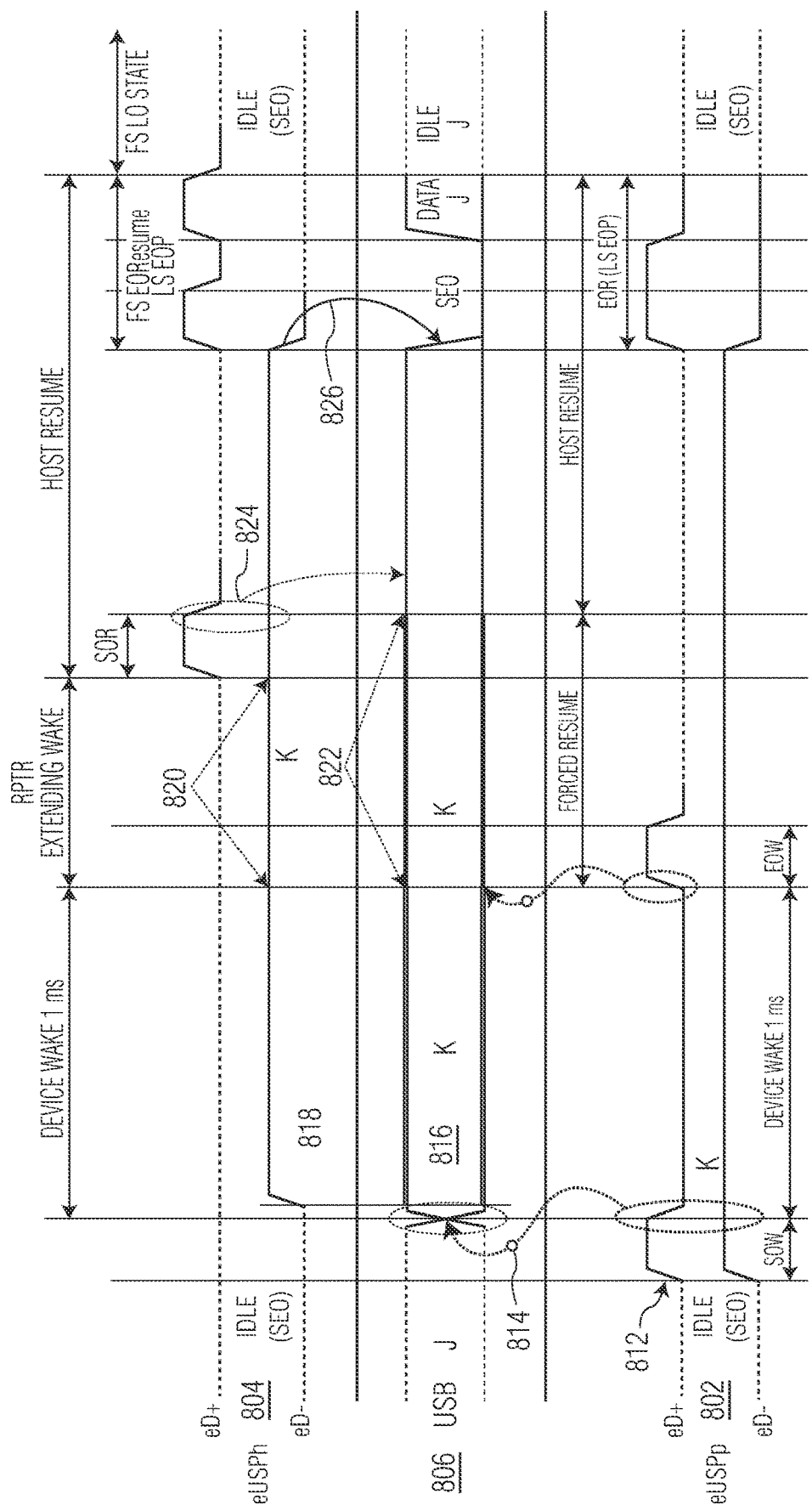
FIG. 8 is a timing diagram of wake signals for a USB Full Speed mode between a device and a host through eUSB repeaters.

FIG. 8 is a timing diagram of wake signals for a USB Full Speed mode between a device and a host through eUSB repeaters. The principles shown here may be extended to a suspend in USB Low Speed mode suspend and USB High Speed mode as well. A downstream eUSB port of a peripheral repeater (eDSPp), is coupled to a peripheral device through a peripheral eUSB bus 802 with an eD+ and eD− lines. An upstream eUSB port of a host repeater (eUSPh) is coupled to the host through a host eUSB bus 804 with an eD+ and eD− lines. The peripheral repeater and the host repeater are coupled to each other through a USB bus 806. While the device is shown as communicating through a peripheral repeater, some devices may not use the peripheral repeater but communicate directly through the USB bus 806. The peripheral eUSB bus is used to better show the behavior of the device.

When the device is to communicate with the host or with another device through the host then it starts the signaling by driving a Start of Wake (SOW) 812 on the peripheral eUSB bus to the peripheral repeater. In some embodiments, the SOW 812 is a "1" on both lines of the eUSB transceiver. The peripheral repeater detects the end of the SOW 812 and passes at 814 the wake to the USB bus 806. The wake signal is sent as a K signal on the USB bus from the device to the host. When the host repeater detects the wake signal as a K 816 on the USB bus, it repeats the wake signal by forcing at 818 a wake onto the Host's eUSB bus. In FS Mode, the wake signal is formed as a high impedance on eD+ and a "1" on eD− of the host eUSB bus. The host repeater also sends a forced resume signal back to the device by forcing a K signal on the USB bus 806 during the K signal from the device. Therefore, both the host repeater and the peripheral repeater are driving K onto the USB bus during the device wake period indicated as 1 ms in this example but it could be longer to suit different implementations.

After the device drives the wake signal for the required duration, the device then drives an End of Wake (EOW) state on the peripheral eUSB bus 802 to the peripheral repeater. The EOW is asserted as a rising edge on the eD+ in FS mode. The eD− line is unchanged. After receiving the start of the EOW the peripheral repeater stops driving the wake signal on the USB bus 806. Without the host repeater generating a forced resume signal and driving it onto the USB bus, the USB bus would return to idle. If the host were not ready to respond, then the device could try another wake. The host may or may not be ready then or the host may have returned to a suspend or other low power state. However, as shown, the host repeater continues to drive the forced resume signal as a K on the USB bus 806. Therefore, the USB bus remains at a K state. In other words, the detector circuit detects the end of wake signal from the device and continues sending the forced resume signal after detecting the end of wake signal.

In this example the device generated a wake pulse in the form of an SOW 812 with the minimum duration allowed in the eUSB2 specification of 1 ms. The host responds by generating resume signaling (Host Resume) at 824, but not until well after the 1 ms wake pulse. In other circumstances, the host may generate the host resume signaling even after a 15 ms wake pulse. During this intermediate period (labeled as Forced Resume), the host repeater continues to drive at 820 a generated wake signal, a K, onto the host eUSB bus and a forced resume signal onto the USB bus at 822. This allows a host a longer wake duration before the host must respond. In addition, some device may not be able to tolerate the USB bus transitioning to an Idle J at any time during the wake process. By sending the forced resume signal on the USB bus, devices that do not tolerate a USB bus state transition are not affected. USB accepts a large variety of different devices made at different times and so the host repeater is more useful when it accommodates a wide range of different devices.

After the host has resumed and is active, the Host drives a Start of Resume (SOR) on the host eUSB bus 804 as a rising edge of a line of the eUSB bus, either eD+ or of eD−, depending on the mode. At the start of the SOR, the host repeater stops sending the forced resume signal to the host eUSB bus 804. This allows the host to drive the host eUSB bus uncontested. During this time (SOR) the host repeater continues to send the forced resume signal by forcing a K signal onto the USB bus 806. After the host stops driving its SOR it transitions into its host resume K signaling. At this time the host repeater stops forcing the resume K onto the USB bus and at 824 simply passes the eUSB bus state down to the USB bus. This will result in the bus remaining at a K state during this period (Host Resume) with no glitches in state.

The host starts its End of Resume (EOR) by generating a Low Speed EOP. The host repeater passes this EOP at 826 down to the USB bus in the same manner as it repeats any signal including any EOP. In this case this results in the USB bus going to SE0 for a duration of 2 LS UI (Low Speed Unit Intervals) and then to J. The peripheral repeater passes this to the peripheral eUSB bus 802 to end the Wake from Suspend process. The process and timing may be adapted to suit LS mode, HS mode, and other data bus protocols.

Figure 9:
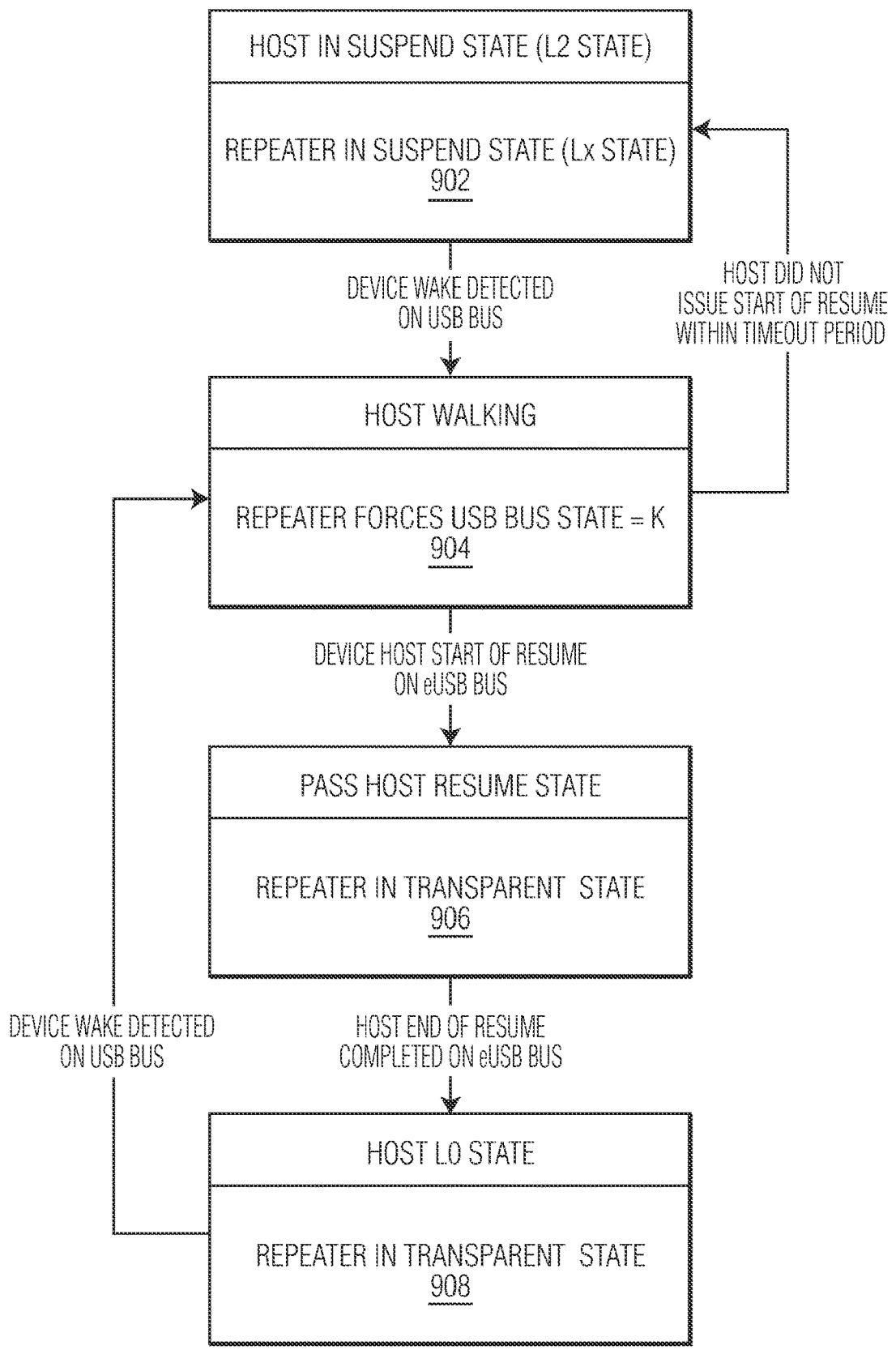
FIG. 9 is a state diagram of an eUSB host and a host repeater coupled to a USB bus through the host repeater.

FIG. 9 is a state diagram of an eUSB host and a host repeater coupled to a USB bus through the host repeater. The repeater detector logic includes a host state machine for implementing all the control mechanisms needed for a normal host side repeater (as defined in the eUSBs Specification). The additional signaling described herein may be added to this state machine or implemented in a different part of the repeater, for example the high-level logic. In FIG. 9 the Host is the same or similar to the host of FIGS. 7 and 8. The repeater is the host repeater.

The starting state is a host suspend state 902 in which the host is in a low power state, e.g., an L2 state in eUSB, and the repeater is in a suspend state, e.g., an Lx state in eUSB. In some examples, the repeater state starts in a USB 2.0 Suspend state. During this state, the repeater is in a very low power state disabling as much circuitry as possible. It is not driving either of its busses, the eUSB bus and the USB bus, except for the normal pulldown resistors that are enabled during the suspend state. This is a defined state in the eUSB2 and USB 2.0 Specifications. In some embodiments, the host and possibly also the device are in their suspend state and the repeater is in its active state when the device wake occurs. The repeater handles this in exactly the same way. The USB Host is also in a USB2 Suspend state in which many components are disabled and others are put to sleep. Because of this, the time that is required to exit the suspend state may be longer than is accommodate by the USB bus.

A host waking state 904 starts in response to a wake issued from a device attached to the USB bus. The host side repeater detects this as the USB bus going from its idle J state to the K state. The repeater may debounce this condition for a few microseconds to make sure that the transition represents a valid wake signal. After the few microseconds, the repeater transitions to its forced resume state while the host is in a host waking state.

In the repeater's forced resume state, shown with the host waking state 904, the repeater forces the USB bus state to K by using its USB drivers to drive a Full Speed K (for Full Speed and High Speed Mode) or Low Speed K (for Low Speed Mode) on the USB bus. A Full Speed K is achieved by driving D+ to low and D− to high as defined by the USB 2.0 specification. The repeater also forces the host side eUSB bus to the K state using its single ended drivers. The repeater is driving eD− high while not driving eD+ for Full Speed or High Speed mode. The repeater is driving eD+ high while not driving eD− for Low Speed mode. In some examples, the repeater may then start a timeout timer to detect if the host issues a host resume before the timeout expires. The reason to include a timer is that during this time, since the repeater is driving both the USB bus and the eUSB bus to the K state, the repeater may not detect a disconnect of the device. This may not be desirable to the system. Reasonable timeouts may be on the order of 15 ms (longest device wake), 50 ms, 100 ms, etc. Alternatively, no timeout is used. In alternative embodiments, the timer may be eliminated or the timeout may be extended to allow for a much longer or even an infinite timeout. With a much longer timeout, the forced resume is driven until the host issues its resume or the device stops sending the wake.

Having extended the wake time by sending the forced resume signal to the device, the repeater then waits for the host to start driving its resume. As shown in FIG. 8, this may be detected by the transition of the SOR. It may also be detected in other ways to suit different implementations. If the host does not start its host resume and the repeater detects the timeout condition, then the repeater will return to the host suspend state 902 and wait for either another device wake or a host resume. Otherwise, if the repeater does detect the host starting its host resume with an SOR, then it transitions to its pass host resume state.

The pass host resume state 906 is entered after the repeater detects a host resume from the host. During this state the repeater passes the host resume down to the USB bus by driving the USB bus to a K line state. It also stops driving the eUSB bus except for the normal pulldowns that are enabled as per the eUSB Specification. At the start of the host resume SOR (a rising edge of eD+ for FS and HS modes and eD− for LS mode), the repeater stops driving the other eUSB line (eD− for FS and HS modes and eD+ for LS mode). This is to allow the host to drive an SOR or other conditions as needed (e.g., Port Reset, Control Message). The repeater continues forcing the USB bus to the K state until the end of the host SOR as may be indicated by the falling edge of eD+ for FS and HS modes and eD− for LS mode. After this, the repeater then passes the host resume down to the USB bus. The USB bus should remain in the K state throughout this transition and not glitch between the forced resume signal and the repeated host resume from the host.

The repeater keeps driving the USB bus to the K state until the host drives the end of resume (EOR). The EOR has the same timing as a normal EOP (2 high going pulses on eD+ for FS mode, 2 high going pulses on eD− for LS mode, 1 high going pulse on eD+ for HS mode). For FS and LS mode, this should result in an EOP being driven onto the USB bus during this time as described in the context of FIG. 8. This was shown as the USB going from a K state to an SE0 state upon the first high going pulse then to a data J state upon the second high going pulse and then to an Idle J state after the end of the second high going pulse. A data J state is a J state which is driven onto the bus. An idle J state is accomplished by disabling the single ended drivers and letting the lines float to the natural J state due to the host pulldown resistors on the USB D+ and D− lines and the device pullup resistor on the D+ line (full speed mode) or the D−line (low speed mode). After the host EOR has completed, then the repeater transitions to its FS or LS L0 state to re-enter full speed or low speed operation. For HS mode, the repeater would drive the USB bus to SE0 after the rising edge of eD+ at the start of the host's EOR. SE0 is achieved on the USB bus simply by enabling the HS terminations. At the end of the host's EOR (falling edge on ED+), the eUSB repeater then transitions to its HS L0 state to re-enter high speed operation.

The host L0 state 908 is entered after the host has resumed and the device has been signaled that the host has resumed. The repeater is in a transparent state. The repeater is fully transparent in its repeating mode operation. Packets are passed between the busses as they are received. For full speed and low speed mode, if the eUSB repeater detects a K condition on its USB bus for longer than 8 LS UI, then it will transition to its forced resume state within the host waking state 904. This is because the host and the device must be back in a suspend state, e.g. L2 state, or a low power state already. This causes the device to issue a wake to the host. The repeater treats this like any wake.

In the following description and claims, the term "coupled" along with its derivatives, may be used. "Coupled" is used to indicate that two or more elements have a connection that permits interaction but that there may be intervening physical or electrical components between them. "Electrically coupled" is used to indicate that the interaction is electrical as compared to physical, magnetic, or another form of interaction. As used in the claims, unless otherwise specified, the use of the ordinal adjectives "first," "second," "third," etc., to describe a common element, merely indicate that different instances of like elements are being referred to, and are not intended to imply that the elements so described must be in a given sequence, either temporally, spatially, in ranking, or in any other manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An eUSB (embedded universal serial bus) repeater comprising:
  a USB transceiver coupled to a device through a USB bus and configured to receive a USB data signal from the device and configured to drive a USB data signal to the device;
  an eUSB transceiver coupled to a host through an eUSB bus and configured to receive an eUSB data signal from the host and configured to drive an eUSB data signal to the host, wherein the host is configured to place the USB bus into either a suspend state or an active state;
  repeater logic coupled to the USB transceiver and the eUSB transceiver configured to receive a wake signal from the device, to repeat the received wake signal to the host, to receive a host resume signal from the host and repeat the host resume signal to the device, the repeater logic further configured to repeat data signals between the device and the host; and
  a detector circuit coupled to the USB bus configured to detect the wake signal from the device and to send a forced resume signal to the device by forcing a K signal on the USB bus with the device from a time beginning when the wake signal was received from the device and ending at a time when the detector circuit receives the host resume signal from the host.

2. The repeater of claim 1, wherein receiving the wake signal comprises receiving a start of wake from the device as a 1 on both lines of the eUSB transceiver.

3. The repeater of claim 1, wherein the detector circuit is in a low power state upon receiving the wake signal.

4. The repeater of claim 1, wherein the host has a suspend state, wherein the repeater logic sends the received wake signal to the host to wake the host from the suspend state, and wherein the repeater logic receives the host resume signal when the host has exited the suspend state.

5. The repeater of claim 1, wherein the host suspend state is an eUSB L2 suspend state.

6. The repeater of claim 1,
wherein receiving the wake signal comprises receiving a K signal from the device.

7. The repeater of claim 1, wherein the detector circuit is further configured to detect an end of wake signal from the device and to continue forcing the K signal on the USB bus after detecting the end of wake signal.

8. The repeater of claim 1, wherein the end of wake signal comprises a transition of a line on the USB bus.

9. The repeater of claim 1, wherein the detector circuit is configured to detect an end of resume signal from the host and to repeat the end of resume signal to the device before repeating data signals.

10. The repeater of claim 1,
further comprising a timer configured to start after receiving the wake signal from the device,
wherein if the timer expires before detecting the host resume signal, then the detector circuit is configured to stop forcing the K signal on the USB bus.

11. A method comprising:
detecting a wake signal on a USB bus sent from a device when received by an eUSB repeater;
repeating the wake signal on an eUSB bus to a host coupled to the device through the eUSB repeater;
sending a forced resume signal to the device by forcing a K signal on the USB bus with the device sent from the eUSB repeater to the device from a time beginning when the wake signal was received by the eUSB repeater from the device and ending at a time when the eUSB repeater receives a host resume signal transmitted by the host.

12. The method of claim 11, further comprising repeating data signals between the device and the host on the USB bus after repeating the host resume signal.

13. The method of claim 11, wherein detecting the wake signal comprises receiving a start of wake from the device as a 1 on both lines of the USB bus.

14. The method of claim 11, wherein detecting the wake signal comprises receiving a K signal from the device on the USB bus.

15. The method of claim 11,
wherein the host has a suspend state,
wherein repeating the wake signal causes the host to wake from the suspend state, and
wherein detecting the host resume signal is after the host exits the suspend state.

16. The method of claim 11,
wherein the host suspend state is an eUSB L2 suspend state.

17. A state machine of an eUSB repeater, the state machine comprising:
a host suspend state in which a host coupled to the state machine is in a low power state and the repeater is able to receive signals on a USB bus from a device;
a host waking state in which the host is waking from the suspend state in response to a wake signal from the device and in which the repeater is forcing a first wake signal on the USB bus while the host is waking from the suspend state:
a host resume state in which the host has completed waking up from the suspend state and sends a second wake signal to the repeater,
wherein in the host resume state the repeater stops forcing the first wake signal on the USB bus,
wherein in the host resume state the repeater is in a transparent state repeating the second wake signal from the host to the device; and
a host active state in which the host is active and in which the repeater is in a transparent state repeating signals between the host and the device;
wherein the first wake signal is a K signal; and
wherein the repeater is configured to force the K signal from a time beginning when the wake signal was received from the device and ending at a time when the host resume signal is generated by the host.

18. The repeater of claim 1:
wherein the K signal is a first K signal on the USB bus generated by the repeater; and
wherein the host resume signal is a second K signal on the USB bus with the device that is generated by the host.

19. The repeater of claim 1:
wherein the detector circuit continues sending the forced resume signal during a time after the host has exited a host suspend state and entered a host active state, but before the host has generated the host resume signal; and
wherein the repeater logic repeats the host resume signal to the device after the detector circuit stops sending the forced resume signal.

* * * * *